United States Patent Office 2,852,480
Patented Sept. 16, 1958

2,852,480

AQUEOUS THERMOSETTING ADHESIVE COMPRISING A SALT OF SULFONATED POLYSTYRENE AND AN AMINE-ALDEHYDE RESIN

Oscar P. Cohen, Longmeadow, Mass., assignor to Monsanto Chemical Company, St. Louis, Mo., a corporation of Delaware No Drawing. Application August 16, 1956
Serial No. 604,319

7 Claims. (Cl. 260—29.4)

This invention relates to thermosetting adhesives. More particularly, the invention relates to an improved adhesive base derived from amino resins including urea and melamine and related resins.

Adhesives based on condensation products of urea, thiourea, melamine, aralkyl guanamines, etc., with formaldehyde are widely used particularly for laminating wood as in plywood, bonding wood particles as in chipboard, and in the assembly of furniture. One of the major difficulties with these adhesives is the attainment of a relatively high viscosity for the spreading stage. Such high viscosities have been obtained but generally at the expense either of reactivity of the adhesive, the permanency of the bond, or the water tolerance of the adhesive.

One object of this invention is to provide improved adhesive bases.

A further object is to modify adhesives based on urea, melamine, etc., to obtain higher spread viscosities without harm to the beneficial properties of the adhesives.

These and other objects are attained by dry blending a dry amino resin adhesive with a stable water-soluble salt of a sulfonated polystyrene.

The following examples are illustrative of this invention. Where parts are mentioned they are parts by weight.

Example I

Prepare a dry urea formaldehyde condensate by reacting 1 mol of urea with from 1 to 3 mols of formaldehyde under slightly alkaline conditions at reflux temperature followed by a short heating period under acid conditions and then spray drying. The product is a dry, soluble, or dispersible fusible powder. Blend 100 parts of the dry urea powder with about 0.6 part of the sodium salt of a sulfonated polystyrene having a molecular weight of about 70,000 and containing an average of 1.2 sulfonic acid groups per styrene unit in the polymer chain. The blend is a free-flowing powder which may be dissolved or dispersed in water and mixed with conventional adhesive ingredients such as fibrous fillers, mineral fillers, catalysts, etc., to form adhesives which will thermoset at 100 to 350° F.

Example II

Dissolve 80 parts of the blended powder of Example I in about 85 parts of water and stir into the solution about 20 parts of pecan shell flour until a smooth viscous adhesive is obtained. The viscosity as determined at 25° C. in a MacMichael viscometer using a 26 wire and "D" bobbin is about 40. An adhesive similar in all respects except that it contains no sulfonated polystyrene has a viscosity of about 25. The adhesive spreads easily and smoothly to give a uniform coating on surfaces to be joined such as wood plies. It can be cured at temperatures of from 100 to 350° F. to provide a firm, permanent bond.

Example III

Prepare a dry melamine-formaldehyde adhesive resin by reacting melamine with from 2 to 5 mols of formaldehyde under alkaline conditions and then drying the product. Mix 40 parts of the dry melamine resin with 40 parts of the dry urea resin of Example I and about 0.5 part of the sodium salt of sulfonated polystyrene having a molecular weight of about 70,000 and containing an average of about 1.2 sulfonic acid groups per styrene unit in the polymer. Blend 80 parts of the dry blend with 20 parts of pecan shell flour and then stir the blend into 85 parts of water until a smooth, homogeneous viscous glue is obtained. This glue has a viscosity of about 25 whereas a similar glue prepared without the sulfonated polystyrene has a viscosity of about 10.

Example IV

Prepare two 3-ply, $3/16''$ plywood samples from oak plies by spreading the glue of Example III on the plies at a rate of 40 pounds per thousand square feet of single glue line. One sample, labeled "A" should be made with a glue containing sulfonated polystyrene and the other labeled "B" should be made with the same glue except for the addition of the sulfonated polystyrene salt. The glue line made with the glue containing no sulfonated polystyrene appears starved and grainy, whereas the other glue line is smooth and complete. Laminate the plies using an assembly time of 60 minutes, a press time of 5½ minutes, and a press temperature of 285° F. Sample A has a dry strength of about 197 lbs. and a dry wood failure of about 61%. Sample B has a dry strength of only 61 lbs. and a dry wood failure of 10%.

Example V

Prepare an adhesive base by dry blending about 2 parts of the sodium salt of a sulfonated polystyrene having a molecular weight of about 10,000 and an average sulfonic acid content of about 0.8 sulfonic group per styrene unit in the polymer with 100 parts of a dry melamine-formaldehyde condensate prepared as shown in Example III. Mix 100 parts of the dry blend with about 80 parts of water and about 25 parts of wood flour until a smooth viscous adhesive is obtained having a viscosity of about 20. The adhesive spreads cleanly and smoothly on surfaces to be bonded and cures to an insoluble, infusible state at temperatures of from 200 to 350° F. A similar adhesive made without the sulfonated polystyrene salt has a viscosity of about 5 and spreads to a grainy discontinuous film.

The dry adhesive bases of this invention consist essentially of a fusible, water-soluble or dispersible, amino resin and a small amount of a stable, water-soluble salt of a sulfonated polystyrene.

The amino resins of this invention comprise the formaldehyde condensation products of urea, cyclic ethylene urea, cyclic propylene urea, cyclic ethylene thiourea, thiourea, melamine, alkyl melamines, aryl melamines, aralkyl guanamines, alkyl guanamines, aryl guanamines, and mixtures thereof. The resins are prepared by reacting 1 mol of the amino compound with from 1 to 5 mols of formaldehyde under carefully controlled conditions to obtain water-soluble or dispersible materials. Generally the reaction is carried out under alkaline conditions at reflux temperatures or below and in the case of the urea resins the reaction is finished under slightly acid conditions. After the desired degree of condensation is attained, the resins are recovered by spray drying, drum drying, and other conventional drying means. The preparation of these water-soluble and water-dispersible, fusible resins is well known in the art and is not a part of the claimed invention.

The sulfonated polystyrenes of this invention are the water-soluble products prepared by careful sulfonation of polystyrene having a molecular weight of from 10,000 to about 500,000. Two methods for preparing such materials are described in U. S. Patents 2,533,210 and 2,533,211. The products should have a sulfonic acid content of from 0.5 to 2 sulfonic acid groups per styrene unit in the polymer chain. For the purposes of this invention the sulfonated polystyrene must be used in the form of a stable, water-soluble salt thereof. The preferred salts are the alkali metal salts including the lithium, sodium, potassium, rubidium, and caesium salts but salts of other non-volatile bases such as non-volatile amines, alkanol amines, etc., may be used. The amount of sulfonated polystyrene to be used depends somewhat on the molecular weight of the sulfonated polystyrene and partially on the viscosity of the amino resin. In general the amount of sulfonated polystyrene salt may vary between 0.01 and 10 parts per 100 parts of amino resin.

To prepare adhesives from the dry bases of this invention, the dry base is mixed with 50 to 100 parts of water per 100 parts of base and a fibrous filler such as pecan shell flour, wood flour, walnut shell flour, wheat flour, furafil, solka floc, alpha floc, lignin, etc., or a mineral filler such as clay. The amount of filler may range from 10 to 50 parts per 100 parts of dry base.

It is to be noted that the adhesives set forth in the examples contained no catalysts. The laminating process can be accelerated by the incorporation of various conventional catalysts such as ammonium chloride, paraformaldehyde, magnesium silico-fluoride, aluminum sulfate, diammonium phosphate, etc., at the expense of shorter pot life of the adhesive.

Although it is preferable to dry blend the amino resin with the sulfonated polystyrene salt, the latter may be added to an aqueous dispersion of the amino resin to form an aqueous adhesive provided that the addition is made under carefully controlled conditions of agitation and rate of addition.

Adhesives prepared from the dry bases of this invention are particularly suitable for preparing plywood from both soft and hard woods. Since the bases can be dry blended with the filler, a dry composition can be provided which is quickly and simply made into an adhesive by the addition of sufficient water to prepare a viscous paste.

The addition of the sulfonated polystyrene salts to the amino resins provides a means for increasing the viscosity of aqueous adhesives made therefrom without destroying the advantageous properties of the amino resins as adhesives. In addition, as shown in Example IV, the sulfonated polystyrene salt increases the strength of plywood made from the amino resin adhesives even when used in as small amount as about 0.5 part per 80 parts of amino resin.

The foregoing is given in illustration of this invention. It is obvious that may variations may be made within the spirit and scope of this invention.

What is claimed is:

1. An adhesive base consisting essentially of 100 parts of a water-dispersible, fusible, amino resin and from 0.01 to 10 parts of a stable, water-soluble salt of sulfonated polystyrene, said amino resin being a condensation product of 1–5 mols of formaldehyde and 1 mol of an amino compound taken from the group consisting of urea, cyclic ethylene urea, cyclic propylene urea, cyclic ethylene thiourea, thiourea, melamine, alkyl melamines, aryl melamines, aralkyl, guanamines, aryl guanamines, alkyl guanamines, and mixtures thereof, said sulfonated polystyrene containing an average of 0.5–2 sulfonic acid groups per styrene unit and having a molecular weight of from 10,000 to 50,000.

2. An adhesive base as in claim 1 containing in addition from 10 to 50 parts of a fibrous filler.

3. An adhesive base as in claim 1 wherein the amino resin is a urea-formaldehyde resin.

4. An adhesive base as in claim 1 wherein the amino resin is a melamine-formaldehyde resin.

5. An adhesive base as in claim 1 wherein the amino resin is a mixture of melamine-and-urea-formaldehyde resins.

6. An adhesive base as in claim 1 wherein the salt of sulfonated polystyrene is an alkali metal metal salt.

7. An adhesive comprising an aqueous dispersion of the adhesive base of claim 1.

References Cited in the file of this patent

UNITED STATES PATENTS 2,580,271    Baer    Dec. 25, 1951